United States Patent Office 2,718,082
Patented Sept. 20, 1955

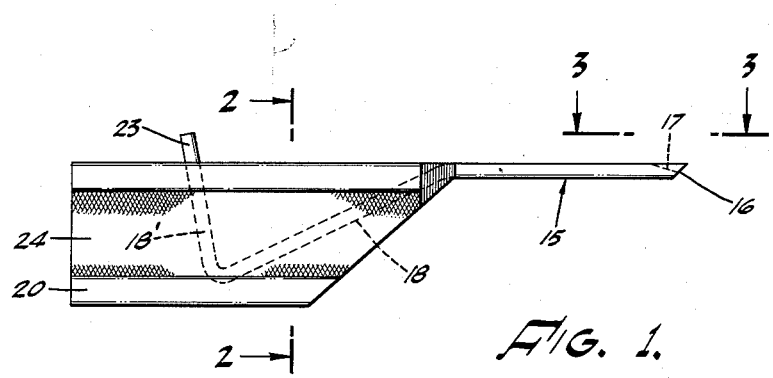
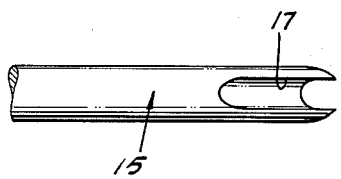
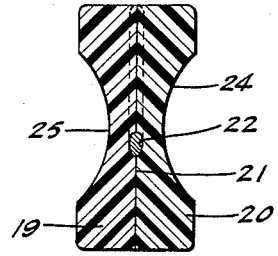
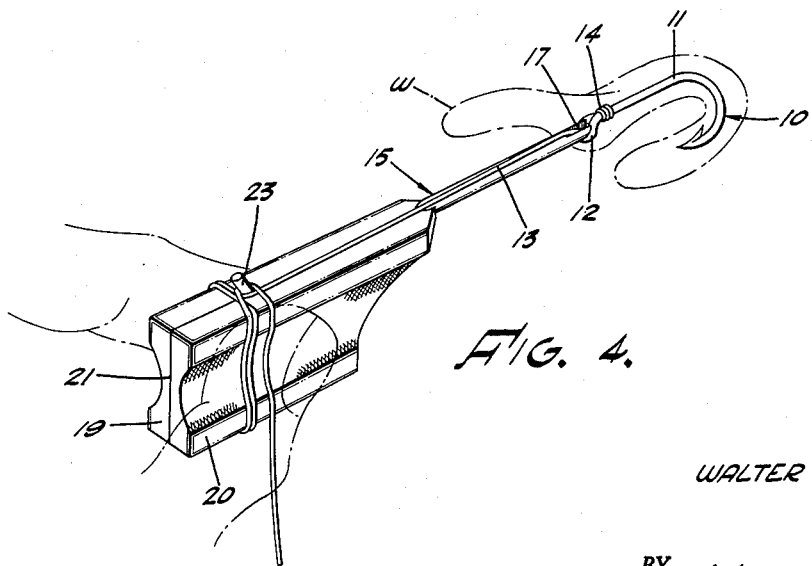

2,718,082

FISHHOOK HOLDER FOR APPLYING BAIT

Walter P. Limacher, Altadena, Calif.

Application April 24, 1953, Serial No. 350,937

6 Claims. (Cl. 43—1)

This invention relates to a device for holding fishhooks.

Explanatory of the present invention, one form of the conventional fishhook has an eye formed at the end of its shank which is bent laterally so that the plane of the eye forms a decided angle to the shank of the hook. The leader or snell is sometimes given one or more wraps around the shank and is tied to the hook immediately in advance of the eye. This leader extends through the eye and in turn is attachable to the fishing line.

Frequently the casual fisherman merely applies bait to the crotch of the hook and over the point or barb. Sometimes the bait covers a substantial portion of the shank. Usually, however, the casual fisherman leaves the eye of the hook exposed and as this eye is metallic and frequently is bright, the fish are startled thereby and are not attracted to the bait. I have found that it is important to have the bait applied to the hook in such a manner as to also cover the eye. This is particularly true when worms are used for bait.

It is a primary object of the present invention to provide a holder enabling the conventional hook to be rigidly held in such a manner that bait such as worms can be applied to the hook very readily and caused to cover and thus conceal the laterally bent eye on the conventional hook. While the holder has been primarily designed for this purpose it may be used for other and analogous purposes, such as the tying of flies about the hook.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the holder embodying the present invention;

Fig. 2 is a vertical section taken substantially upon the line 2—2 upon Fig. 1 in the direction indicated;

Fig. 3 is a partial view on an enlarged scale of the end of the holder and may be regarded as having been taken substantially upon the line 3—3 upon Fig. 1; and Fig. 4 is a perspective view illustrating one manner in which the holder may be used.

Referring to the accompanying drawings wherein similar reference characters designate similar parts throughout, a conventional fishhook is indicated at 10 having a shank 11 on which there is formed an eye 12. This eye is bent laterally with relation to the shank 11 so that the leader or snell 13 which is wrapped around and tied to the shank as at 14 immediately in advance of the eye can be extended through the eye.

The holder embodying the present invention consists of a rod-like element 15 having a diameter at least as great as that of the eye 12 of the hook with which the holder is designed to be employed. The diameter may be in excess of the diameter of the eye 12 but cannot be so small that the rod-like element will pass through the eye. This rod-like element has a beveled end 16, the face of which is so arranged that it forms an acute angle with the axis of the rod-like element 15 that is substantially supplemental to the obtuse angle conventionally formed between the plane of the eye 12 and the axis of the shank 11. A groove 17 is formed in the rod-like element 15 having a width sufficient to receive the leader or snell 13. This groove extends from the face of the bevel to that side of the rod-like element 15 with which the face forms an acute angle. The bottom of the groove is disposed near or slightly below the center of the face 16.

The rear end of the rod-like element 15 is bent downwardly as indicated at 18 and then upwardly as indicated at 18' to form an angular portion which fits between two opposed portions 19 and 20 of a handle. These two portions of the handle may be formed of a synthetic resin plastic, wood, or any other suitable material which can be fastened together in abutting relationship, the abutting faces being indicated at 21. These portions may be secured together, such as by rivets, but preferably an adhesive is employed. Grooves 22 complementary to the angular portion formed by the portions 18 and 18' are formed in the abutting faces 21 to accommodate this angular portion so that the rod-like element will be rigidly held in the handle. The portion 18' terminates in an upstanding end 23 that projects laterally from the handle and which is preferably inclined rearwardly with relation to the axis of the rod-like element. This end portion 23 serves as a snubbing post around which the leader or snell 13 can be snubbed and given one or more wraps around the handle as illustrated in Fig. 4. The sides of the handle are formed with two opposed grooves 24 and 25 and after the snell or leader 13 has been given these wraps around the handle the portions of the snell which extend across the grooves 24 and 25 can be pressed therein by the thumb and forefinger to draw the leader or snell tight so as to hold it in a taut condition and thus hold the eye 12 pressed against the beveled face 16. When so held the shank 11 of the hook is held in a position approximately coincident with the axis of the rod-like element 15. The taut condition of the leader or snell causes the hook to be held quite firmly with its shank in alignment with the length of the rod-like element.

With the hook thus held in position against the rod-like element, a bait such as a worm W may be easily and quickly applied to the hook. In the case of the ordinary angle worm I find it advantageous to insert the pointed end of the hook into the worm immediately above the collar on the worm. The worm may then be passed over the barb and slipped onto the shank 11. It can be passed over the eye 12 so as to completely enclose and thus conceal the eye. That portion of the worm that extends beyond the collar may be left free to wiggle and thus attract fish, and that portion of the worm which has not been penetrated by the pointed end is also left free to wiggle. After the worm has been applied to the hook the snell or leader 13 is unwrapped from the handle and the end of the rod-like element 15 is withdrawn from the worm.

While the holder has been primarily described in connection with the application of worms to fishhooks, it will be readily appreciated that it may be advantageously employed in applying other baits. Furthermore, as the hook is held quite rigidly against the end of the rod-like element, the holder may be employed, if desired, in tying flies about the shank 11. It will be readily appreciated that the improved holder can be very easily and economically manufactured and can be advantageously used in applying baits to fishhooks. When it is desired to apply the bait it is merely necessary to position the eye 12 against the beveled face 16, draw the snell or leader 13 that extends through the eye through the groove 17 and snub it around the snubbing post 23, and then give the snell or leader one or more wraps around the handle as illustrated in Fig. 4.

Various changes may be made in the details of construction without departing from the spirit and scope of the invention as defined by the appended claims.

I claim:

1. A device of the class described comprising a straight, solid, rod-like element having a diameter at least as great as the eye of a fishhook with which the device is to be used, said element having a flat beveled end the face of which forms an angle with the longitudinal axis of the element such that when the eye of the fishhook is positioned thereagainst the shank of the hook will be arranged approximately coincident with said axis, there being a groove formed in said element extending from said face to that portion of the side of the element which forms an acute angle with the face, said groove being of a width capable of receiving the snell or leader of the hook.

2. A device of the class described comprising a straight, solid, rod-like element having a diameter at least as great as the eye of a fishhook with which the device is to be used, said element having a flat beveled end the face of which forms an angle with the longitudinal axis of the element such that it is supplementary to the obtuse angle formed between the plane of the eye of the hook and the axis of the shank of the hook, there being a groove formed in said element extending from said face to that portion of the side of the element which forms an acute angle with the face, said groove being of a width to receive the snell or leader of the hook.

3. A device of the class described comprising a straight, solid, rod-like element having a diameter at least as great as the eye of a fishhook with which the device is to be used, said element having a flat beveled end the face of which forms an angle with the longitudinal axis of the element such that when the eye of the fishhook is positioned thereagainst the shank of the hook will be arranged approximately coincident with said axis, there being a groove formed in said element extending from said face to that portion of the side of the element which forms an acute angle with the face, said groove being of a width capable of receiving the snell or leader of the hook, a handle on the element, and means on the handle by which the leader or snell may be held taut to hold the eye of the hook against said face.

4. A device of the class described comprising a rod-like element having a diameter at least as great as the eye of a fishhook with which the device is to be used, said element having a beveled end the face of which forms an angle with the longitudinal axis of the element such that when the eye of the fishhook is positioned thereagainst the shank of the hook will be arranged approximately coincident with said axis, there being a groove formed in said element extending from said face to that portion of the side of the element which forms an acute angle with the face, said groove being of a width capable of receiving the snell or leader of the hook, and a handle on the element remote from said face, there being a projection extending laterally from the handle about which the leader or snell may be snubbed.

5. A device of the class described comprising a rod-like element having a diameter at least as great as the eye of a fishhook with which the device is to be used, said element having a beveled end the face of which forms an angle with the longitudinal axis of the element such that when the eye of the fishhook is positioned thereagainst the shank of the hook will be arranged approximately coincident with said axis, there being a groove formed in said element extending from said face to that portion of the side of the element which forms an acute angle with the face, said groove being of a width capable of receiving the snell or leader of the hook, and a handle on the element remote from said face, there being a projection extending laterally from the handle about which the leader or snell may be snubbed, the handle having longitudinally extending grooves on the opposite sides thereof into which portions of the snell or leader may be pressed after being snubbed about the projection to hold the snell or leader taut.

6. A holder for fishhooks comprising a rod-like element having a beveled face at its outer end, there being a groove in said element extending from adjacent the center of said face to that portion of the side of the element with which the face forms an acute angle, the rear portion of the rod-like element being bent downwardly and then upwardly terminating in a snubbing post, and a handle comprising two opposed portions fitting about the downwardly and upwardly bent portions of the rod-like element, said handle having two oppositely disposed grooves formed on the exterior thereof.

References Cited in the file of this patent

UNITED STATES PATENTS

| | | |
|---|---|---|
| 2,445,620 | Ketland | July 20, 1948 |
| 2,492,799 | Holland | Dec. 27, 1949 |
| 2,561,281 | Lawrence | July 17, 1951 |
| 2,586,431 | Kirchbaum | Feb. 19, 1952 |
| 2,589,976 | Steele | Mar. 18, 1952 |
| 2,603,027 | Barber | July 15, 1952 |